Figure 1:
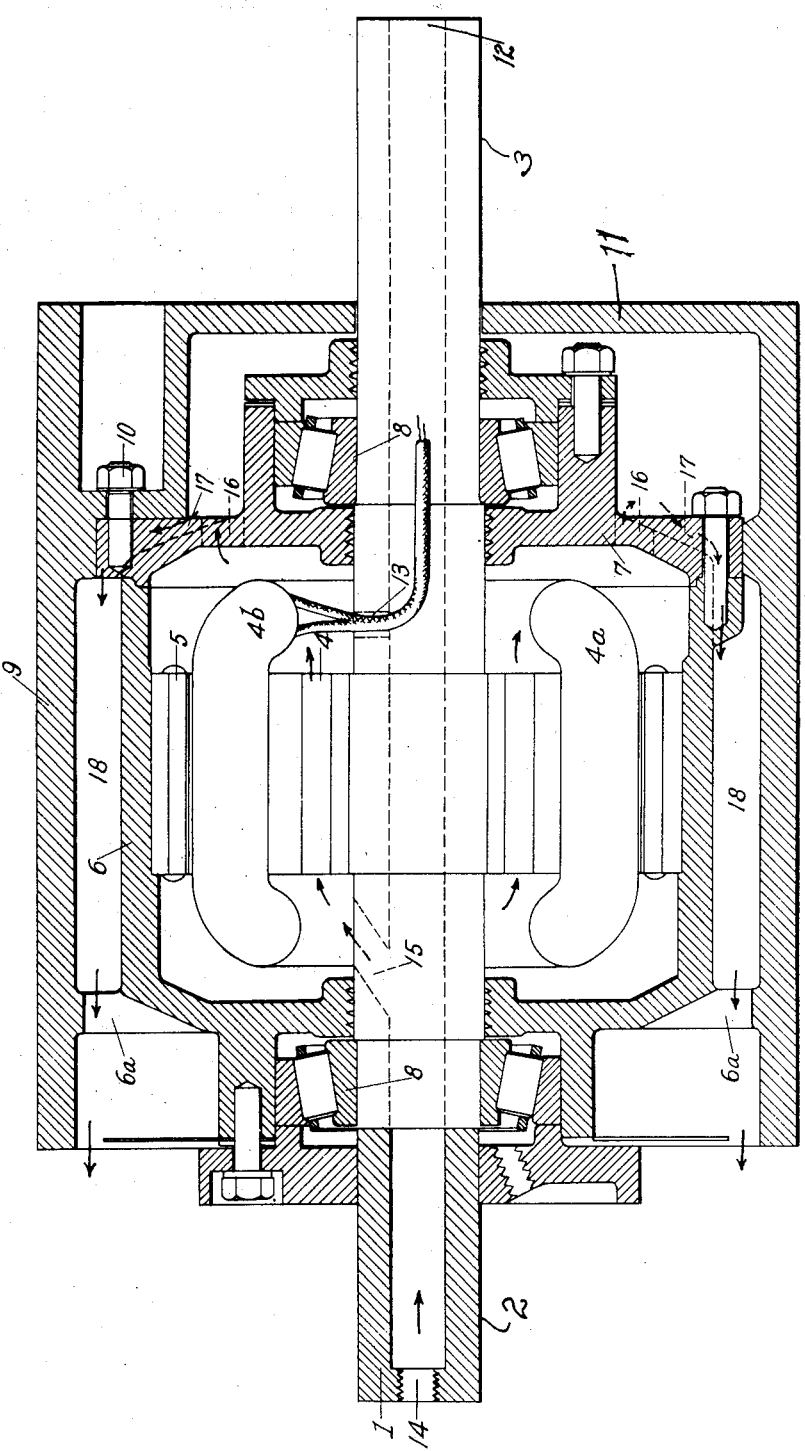

Sept. 1, 1931.  W. McKEE  1,820,985
TEMPERATURE CONTROLLED MOTOR DRIVEN ROLLER
Filed July 1, 1927   2 Sheets-Sheet 1

INVENTOR
Willis McKee
BY
Richey & Watts
ATTORNEYS

Patented Sept. 1, 1931

1,820,985

UNITED STATES PATENT OFFICE

WILLIS McKEE, OF CLEVELAND, OHIO, ASSIGNOR TO THE CENTRAL UNITED NATIONAL BANK, A CORPORATION OF THE UNITED STATES

TEMPERATURE CONTROLLED MOTOR DRIVEN ROLLER

Application filed July 1, 1927. Serial No. 202,830.

This invention relates to conveyor rollers of the type driven by individual motors and is particularly concerned with such rollers having enclosed motors and provided with means for cooling the same.

Conveyors for use in steel mills and other places where the surrounding temperature is relatively high or where highly heated articles are being conveyed are often subjected to temperature conditions where the surrounding atmosphere is more highly heated than the bearings of the conveyor rollers should be called upon to withstand. This condition is, of course, aggravated when the motors of such rollers are more or less totally enclosed. For certain working conditions it is essential that the motor be more or less enclosed to prevent injury thereto by dirt, water and the like. My invention accordingly is directed to the construction of the individual motor driven roller in which means is provided for maintaining the temperature of the motor below a predetermined point and providing the motor with its own atmosphere.

Figure 2:
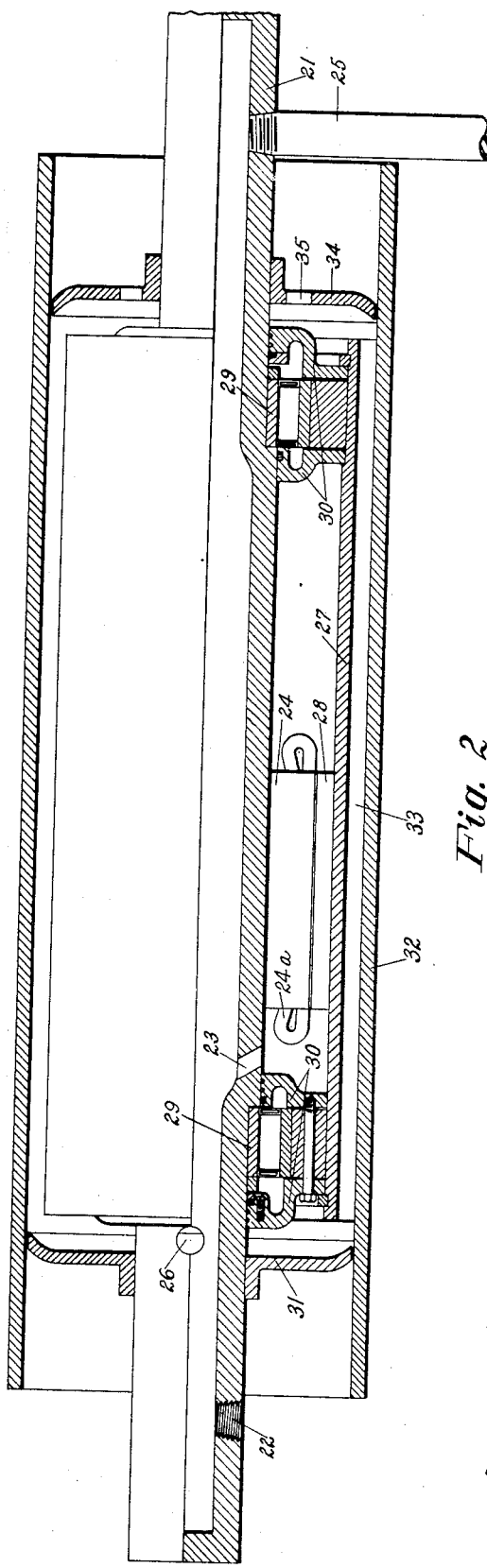

In the drawings accompanying this specification and forming a part thereof,

Fig. 1 is a vertical sectional view through one form of motor roller embodying my invention; and Fig. 2 is a vertical view, partly in section, of another embodiment of my invention.

Referring now to Fig. 1 of the drawings, 1 indicates a non-rotatable shaft suitably supported as at 2 and 3 at either end and carrying intermediate its ends the stator 4 of a motor. The rotor 5 of the motor is disposed radially outward of the stator 4 and is carried by a shell 6 which, together with endplate 7, constitute a housing for the motor which is rotatably supported by means of antifriction devices 8 to rotate on the shaft 1. A second shell 9 is disposed in telescoped position over the shell 6 and is secured thereto in any convenient manner, for example, by means of cap-screws 10. Preferably this shell 9 is closed at one end 11 for a purpose presently to appear, and at its other end is supported by legs 6a on shell 6.

The shaft 1 is hollow for a part of or all its length. Through opening 12 leading thereinto the electrical lead lines 4b for the winding portion 4a of stator 4 are carried and emerged through opening 13 to the stator. Through another opening 14 cooling air or other suitable fluid is lead from any suitable source into the interior of the shaft 1 and then through a passage 15 into the space within the housing 6 occupied by the rotor and stator parts. The cooling fluid then passes through a plurality of openings 16 in the end plate 7 into the space enclosed by the end wall 11 of member 9 and then through spaced openings 17 between the cap screws 10 into the space 18 between the casing 6 and the shell 9 from which it escapes at the end of the member 6 into the atmosphere. This flow of fluid prevents entrance of harmful substances into the motor while water or other liquid is kept out or discharged during rotation of the roller by centrifugal force.

It will be understood that I have provided means for passing a cooling fluid through the motor even though the latter is enclosed, thereby providing the motor with its own atmosphere and by suitably regulating the temperature and speed of flow of the entering fluid I can control the temperature of the motor within reasonable limits. The entering fluid serves to cool the motor parts while the escaping fluid serves both to cool the member 9 which is in contact with the highly heated articles being conveyed and the exterior of casing 6, in this way doubly cooling the roller.

In Fig. 2, I have illustrated a modified form of apparatus embodying my invention in which a shaft 21 hollow for a part of or all its length is provided near one end with an opening 22 through which electrical connections may be lead into the interior thereof and thence through opening 23 to the windings 24a of stator 24 carried by the shaft 21 intermediate its end. The opening 23 may be sealed after wires are positioned. The shaft 21 is also provided with a cooling fluid connection 25 through which fluid may be brought into the interior of the shaft 21, and passes lengthwise of the shaft 21 and escapes through an opening 26 beyond the housing which includes the shell 27 carrying on its inner surface the motor rotor 28 disposed radially outward of the stator 24 and the bearings 29 with the adjacent positioning members 30. The cooling fluid escaping through opening 26 is deflected by baffle plate 31 carried by the shaft 21 adjacent to the opening 26 and is directed into the space between the housing 27 and the cylindrical shell 32 disposed in telescoping relation over the shell 27 and spaced radially outward therefrom to provide a space 33 between the two parts. The cooling fluid directed into the space 33 passes to the opposite end of the casing 27 where it encounters baffle 34 similar to baffle 31 except that it is provided with one or more fluid outlet holes 35 through which the fluid flowing in space 33 may escape to the atmosphere.

It will be understood that by means of this apparatus a cooling fluid may be passed lengthwise of the shaft 21 past the motor stator serving thereby to cool the interior of the shaft and decrease the temperature of the motor parts and in passing through the passage 33 to cool the outer side of the motor parts as well as to dissipate heat accumulated by the article conveying shell 32 which contacts with highly heated articles being conveyed. In this form of device the motor is also enclosed against the entrance of water, scale or other harmful materials as in the apparatus of Fig. 1 and furthermore, the temperature of the motor parts in either form of device shown can be readily controlled by fluid of any suitable temperature.

Having thus described my invention so that others may be able to practice the same what I desire to secure by Letters Patent is defined in the claims.

What is claimed is:

1. A motor driven roller comprising a non-rotating shaft having a cooling gas passage therein and carrying a motor stator, a motor rotor, means for housing the stator and rotor, an article conveying shell disposed outwardly about the said means to provide a cooling fluid space therebetween, and means for passing a cooling fluid through the said passage in the shaft and through said space.

2. A motor driven roller comprising a motor having a non-rotating shaft provided with a cooling gas passage therein, means for housing the said motor, an article conveying shell surrounding but spaced apart from the said motor to provide a cooling gas passage therebetween, and means for passing cooling gas through the said shaft and said space.

3. A motor driven roller comprising a housed motor, a non-rotating shaft therefor, an article conveying shell surrounding said housed motor and spaced apart therefrom and means for controlling the temperature of said roller including a fluid passage in said shaft and means for directing fluid through the motor housing and the space between said shell and the motor housing.

4. A motor driven roller comprising a substantially enclosed motor, a non-rotating hollow shaft therefor, an article conveying member surrounding and spaced radially apart from said motor, and means for controlling the temperature of said roller including a passage communicating with the interior of the shaft and the space between the said roller and shell.

5. A motor driven roller comprising a stator mounted on a non-rotating hollow shaft, a rotor, means for substantially enclosing said stator and rotor attached to and rotatable with said rotor, an article conveying shell attached to said enclosing means in radially spaced apart relation thereto and means for causing temperature regulating fluid to pass through the hollow shaft, the motor enclosure and the space between the shell and motor enclosure.

6. A motor driven roller comprising a non-rotating shaft having a cooling fluid passage therein and carrying motor stator windings, a motor rotor, means for substantially enclosing said stator and rotor, an article conveying shell disposed outwardly about said enclosing means to provide a cooling fluid space therebetween and means for passing a cooling fluid through the passage in the shaft, over said stator windings and through said cooling fluid space between said shell and motor enclosure.

In testimony whereof I hereunto affix my signature this 10th day of June, 1927.

WILLIS McKEE.